(12) United States Patent
Horio et al.

(10) Patent No.: US 6,481,863 B2
(45) Date of Patent: Nov. 19, 2002

(54) MIRROR ASSEMBLY FOR A VEHICLE

(75) Inventors: Wataru Horio, Aichi-ken (JP); Tadashi Ejiri, Aichi-ken (JP); Toshinobu Mizutani, Aichi-ken (JP); Tadayoshi Kato, Aichi-ken (JP); Masahide Inayama, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/816,339

(22) Filed: Mar. 26, 2001

(65) Prior Publication Data

US 2001/0026411 A1 Oct. 4, 2001

(30) Foreign Application Priority Data

Mar. 31, 2000 (JP) ........................................ 2000-098491

(51) Int. Cl.[7] .............................................. G02B 7/182
(52) U.S. Cl. ...................................... 359/872; 248/476
(58) Field of Search ................. 359/841, 872, 359/873, 874, 876, 877; 248/476, 479, 487

(56) References Cited

U.S. PATENT DOCUMENTS

| 4,225,212 | A | * | 9/1980 | Grabowski | 359/877 |
| 5,198,929 | A | * | 3/1993 | Clough | 359/513 |
| 5,604,644 | A | * | 2/1997 | Lang et al. | 359/871 |
| 5,621,577 | A | * | 4/1997 | Lang et al. | 359/872 |

FOREIGN PATENT DOCUMENTS

JP                63-70447                5/1988

* cited by examiner

*Primary Examiner*—Mark A. Robinson
(74) *Attorney, Agent, or Firm*—Nixon Peabody LLP; Thomas W. Cole

(57) ABSTRACT

In a door mirror in accordance with the present invention, at a connecting portion near a driver's seat or a passenger seat, an opposing portion which is a boundary between the connecting portion and a lid is exposed on the surface of a visor at a side toward the substantial rear of a vehicle. Therefore, even if steps are formed at the opposing portion and slight irregularities are thereby formed on the surface of the visor, air flow does not flow over the opposing portion, or orientation of air flow is not rapidly changed or turbulence is not generated over or below the opposing portion. In this way, noise such as wind noise generated near the connecting portion can be reduced or eliminated.

13 Claims, 15 Drawing Sheets

_US 6,481,863 B2_

MIRROR ASSEMBLY FOR A VEHICLE

BACKGROUND OF THE INVENTION

1. Field of the Invention

The present invention relates to a mirror provided at the exterior of a vehicle compartment, and particularly to a mirror which is favorable as a door mirror provided near a door at the side of a driver's seat or a passenger seat.

2. Description of the Related Art

An example of mirrors for confirming the rear of a vehicle from the inside of a vehicle compartment is a door mirror provided at the side of a door of the vehicle. An example of such a door mirror is disclosed in Japanese Utility Model Application Publication (JP-Y) No. 4-33157.

As shown in FIG. 15, a door mirror 300 disclosed in JP-Y No. 4-33157 includes a visor cover 302 (which is referred to as an "elastomer mirror body" in the disclosure) which has a dome shape and is open toward a substantial rear of the vehicle in normal use (i.e., during traveling of a vehicle). A visor rim 304 (which is referred to as a "visor" in the disclosure) is mounted to the interior of the visor cover 302. The visor rim 304 is formed in a shape of a case having a shallow base and has a surrounding wall 306 whose shape is similar to that of an opening of the visor cover 302. A mirror main body (mirror) 312 is provided inside the surrounding wall 306 and near the opening of the visor cover 302.

Further, mounting pieces 314 which are hook-shaped and formed so as to protrude from an inner bottom of the aforementioned visor cover 302 pass through a bottom portion 308 of the visor rim 304. Each of the mounting pieces 314 is fastened to the bottom portion 308 of the visor rim 304 by a screw 316.

Moreover, surrounding walls 318 (which are referred to as "sleeve-shaped double wall portions" in the disclosure) which are toroidal in shape are formed at open ends of the visor rim 304 so as to extend therefrom. A marginal portion 32 of the visor cover 302 is inserted and fit between each of the open ends of the visor rim 304 and each of the surrounding wall 318. The marginal portion 320 is thinner than the remaining portion of the visor cover 302, and the sum of the thickness of the marginal portion 320 and the thickness of the surrounding wall 318 roughly corresponds to the thickness of the remaining portion of the visor cover 302.

As shown in an enlarged view of a circle portion in an alternate long and short dash line in FIG. 15, in the above-described structure of the door mirror 300, an abutting surface 322 of the visor cover 302, which faces the surrounding wall 318 at a portion further toward the bottom portion 308 than the marginal portion 320, faces a rim side abutting surface 324 of the surrounding wall 318, which faces the cover side abutting surface 322, in a substantially longitudinal direction of the vehicle. Therefore, a portion 326 at which the cover side abutting surface 322 and the rim side abutting surface 324 abut each other is exposed at outer peripheral surfaces (i.e., the surfaces) of the visor cover 302 and the visor rim 304.

Further, in the door mirror 300 described above, both of the visor cover 302 and the visor rim 304 are molded products which are formed of synthetic resin material. Dimensional control of such molded products formed of synthetic resin material is difficult because they are subjected to so-called shrinkage during molding. Thus, irregularities resulting from dimensional errors take place on the surface of the portion 326 at which the visor cover 302 and the visor rim 304 abut each other.

Furthermore, at the portion where the aforementioned dimensional errors are significant, as shown in the enlarged view of the circle portion in the alternate long and short dash line in FIG. 15, a clearance 328 is formed between the cover side abutting surface 322 of the visor cover 302, which faces the surrounding wall 318 at a portion further toward the bottom portion than the marginal portion 320, and a rim side abutting surface 324 of the surrounding wall 318, which faces the cover side abutting surface 322.

When air flow W passes above the aforementioned irregularities or directly above the clearance 328 which is open to the outer peripheral surface, noise referred to as so-called "wind noise" is generated. Particularly, since the door mirror is provided at a position which is relatively close to the driver's seat or the passenger seat such as a side of a door of a vehicle, there has been demand for reduction in or elimination of such noise during traveling of a vehicle.

SUMMARY OF THE INVENTION

In view of the aforementioned drawbacks, an object of the present invention is to obtain a mirror which can reduce or eliminate noise resulting from the air flow above the surface of a visor.

A first aspect of the present invention is a rearview mirror assembly for a vehicle, comprising: (a) a mirror having a rear surface and an outer periphery; and (b) a visor which includes a visor cover for covering the rear surface of the mirror and a visor rim for surrounding the outer periphery of the mirror, said visor rim having an annular end portion; (c) wherein the visor cover has an annular end portion which engages with the annular end portion of the visor rim when the visor cover and the visor rim are assembled to each other, and wherein the engagement of the visor cover and visor rim annular end portions with one another forms a loop-shaped opposing portion as a boundary between the visor cover and the visor rim, said loop-shaped opposing portion facing a direction towards which a surface of the mirror is usually oriented.

A second aspect of the present invention is a rearview mirror assembly for a vehicle, the rearview mirror assembly comprising: (a) a mirror having a rear surface and an outer periphery; (b) a visor which includes a visor cover for covering the rear surface of the mirror and a visor rim for surrounding the outer periphery of the mirror; (c) a connecting portion for mounting the mirror assembly to a vehicle, said connecting portion being structured with the visor cover and the visor rim at the time of assembling of the visor cover and the visor rim to one another; (d) wherein the connecting portion has an opposing portion forming a boundary between the visor cover and the visor rim when the visor cover and the visor rim are assembled to one another, with said opposing portion facing a direction toward which a mirror surface is usually oriented.

A third aspect of the present invention is a rearview mirror assembly for a vehicle, comprising: (a) a mirror having a rear surface and an outer periphery; (b) a visor which includes a visor cover for covering the rear surface of the mirror and a visor rim for surrounding the outer periphery of the mirror; (c) a frame accommodated within the visor cover and movably supporting the mirror; and (d) a cylindrical reinforcing rib provided between the frame and the visor cover and having an axis extending in a direction substantially orthogonal to the rear surface of the mirror.

DESCRIPTION OF THE PREFERRED EMBODIMENTS

Structure of First Embodiment

Figure 2:
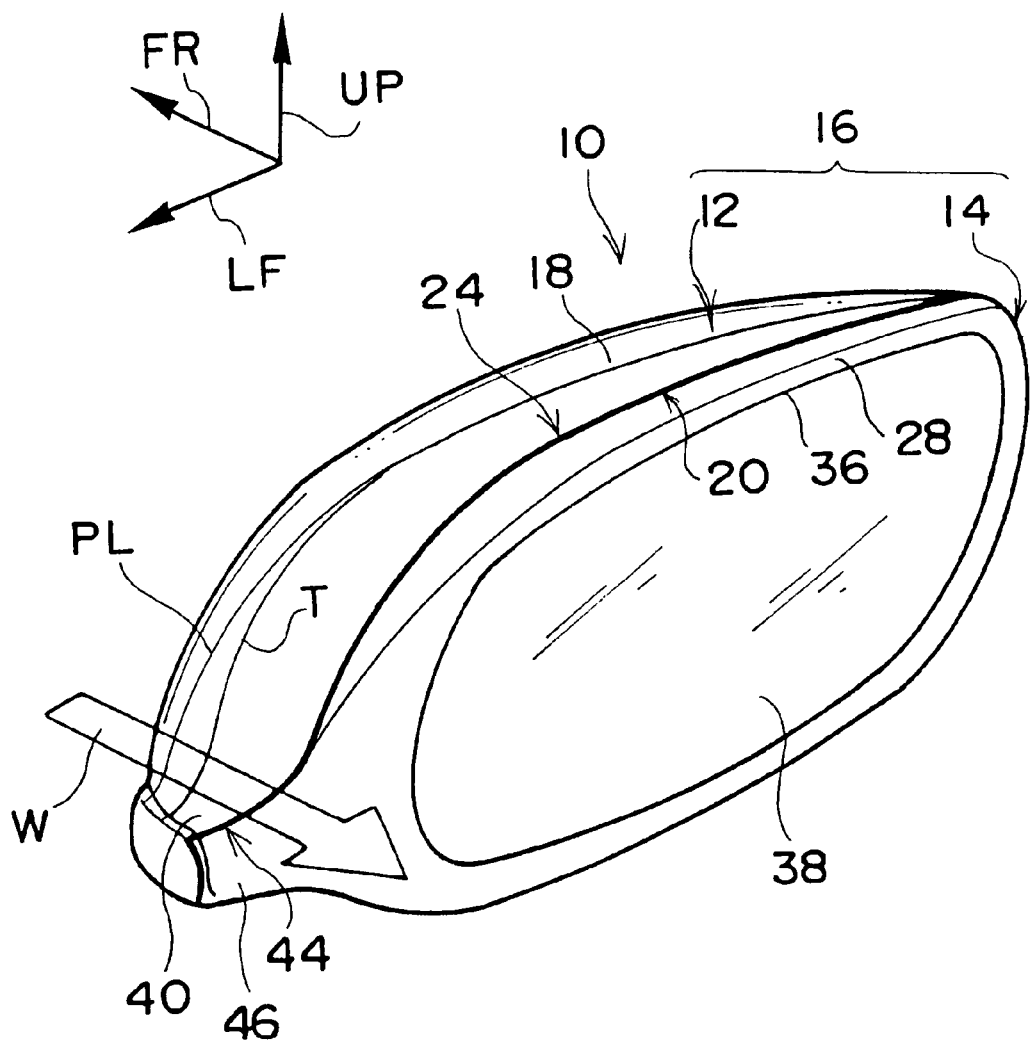
FIG. 2 is a perspective view showing an appearance of the mirror according to the first embodiment of the present invention.
Figure 3:
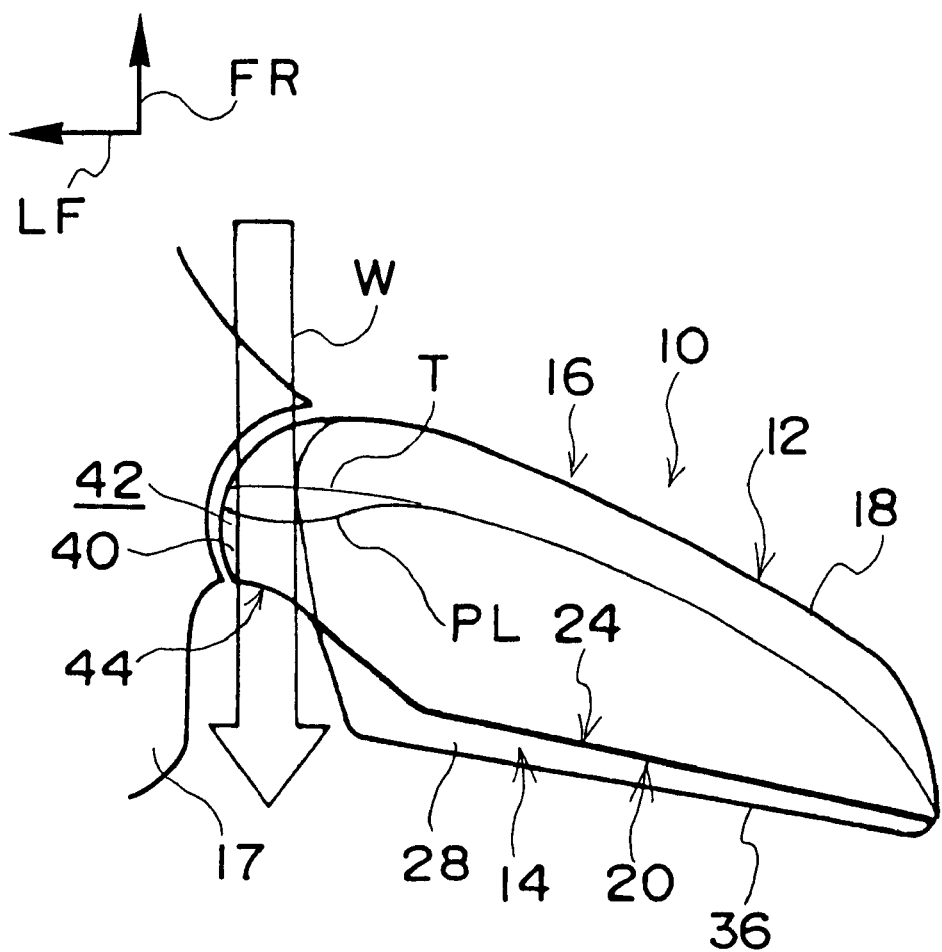
FIG. 3 is a plan view showing the appearance of the mirror according to the first embodiment of the present invention.

FIG. 2 is a perspective view of an appearance of a door mirror 10 as a mirror according to a first embodiment of the present invention, while FIG. 3 is a plan view of the appearance of the door mirror 10. In the respective figures, arrow FR indicates a substantially longitudinal direction of a vehicle, arrow LF indicates a substantially left direction of the vehicle, and arrow UP indicates a substantially upward direction of the vehicle. However, orientation of respective portions of the door mirror 10 which will be described hereinafter is basically the orientation when the door mirror 10 is used during traveling of the vehicle.

As shown in these figures, the door mirror 10 includes a visor 16 which is structured with a visor cover 12 and a visor rim 14.

The visor 16 is formed in a substantially cup-like or dome-like configuration, and is mounted to a vehicle body 17 and is used so that the longitudinal direction thereof coincides with a substantially transverse direction of the vehicle and the transverse direction thereof coincides with a substantially vertical direction of the vehicle. In the above state, the depth direction of the visor 16 coincides with the longitudinal direction of the vehicle, and the visor 16 has an open end toward a substantial rear of the vehicle.

At the open end side of the visor 16 with a ridge line T at a middle portion in the depth direction serving as a boundary, a part of an outer peripheral portion of the visor 16 further toward the substantially upward direction of the vehicle than a middle portion of the visor 16 in the transverse direction is inclined or curved toward the substantial rear of the vehicle with respect to the substantially upward direction of the vehicle. A bottom side (i.e., a side toward a substantial front of the vehicle) of the visor 16 is curved toward the substantial front of the vehicle with respect to the substantially upward direction of the vehicle.

The visor 16 is formed by the visor cover 12 and the visor rim 14. The visor cover 12 is formed of a synthetic resin material which becomes rigid after curing and includes a cover main body 18 formed in a cup-like or dome-like configuration with one end being open. At an open end 20 of the cover main body 18 further toward the exterior of the vehicle compartment in the substantially transverse direction of the vehicle than a middle portion of the cover main body 18 in the longitudinal direction thereof, a so-called parting line PL, which is positioned on a boundary between an upper mold and a lower mold which are used to form the cover main body 18, coincides with the aforementioned ridge line T. With this structure, the parting line PL can be formed in a relatively simple manner. As a result, the structure of metallic molds used for molding can be simplified, and long life of metallic molds can be achieved.

Figure 4:
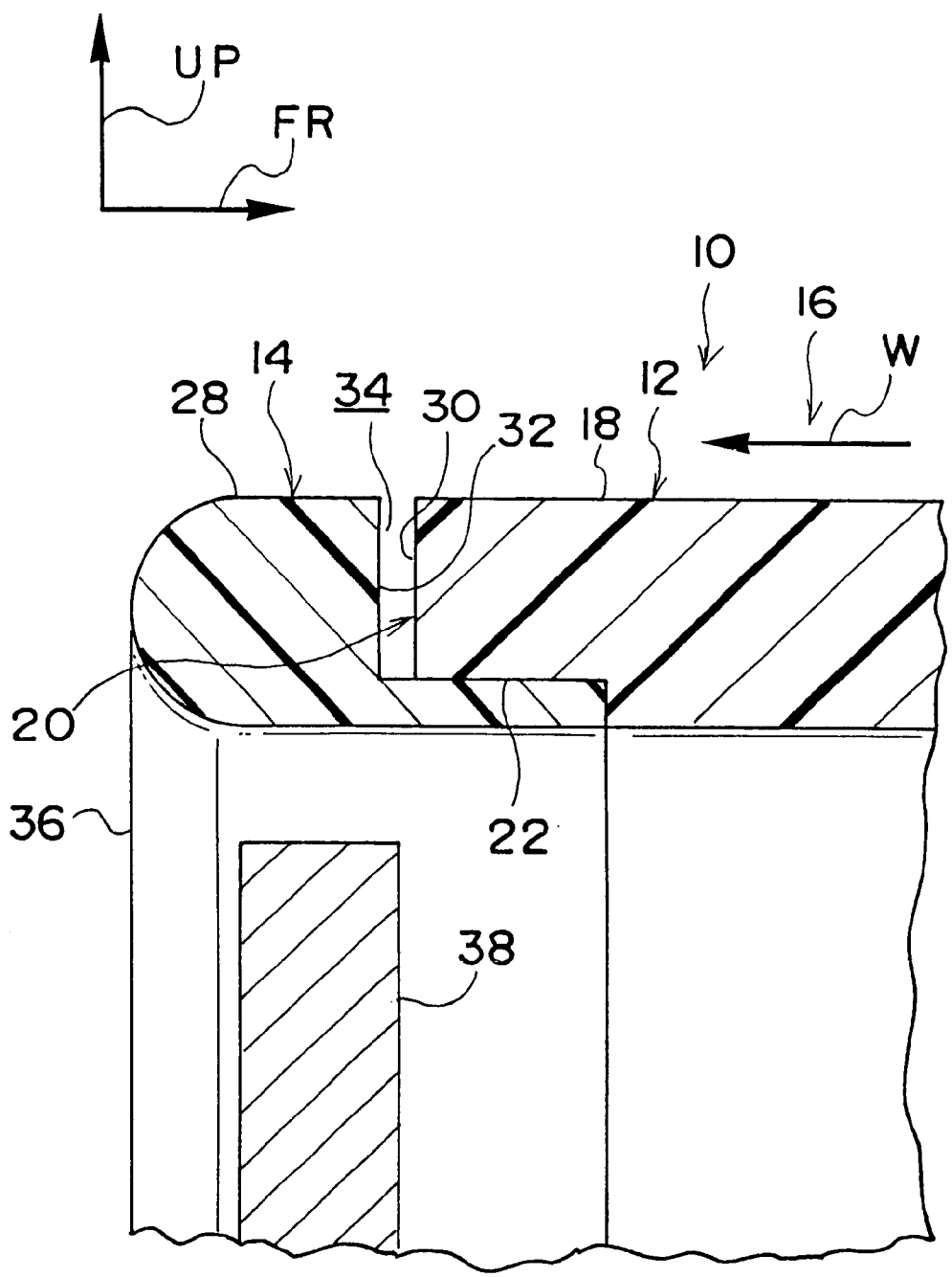
FIG. 4 is a cross-sectional view of a portion, which is different from the main portion, of the mirror according to the first embodiment of the present invention.

Further, as shown in FIG. 4, a fitting portion 22 is formed at the open end 20 of the cover main body 18. The fitting portion 22 is thinner than other portions of the cover main body 18 near the open end 20.

The visor rim 14 is mounted to the open end 20 side of the cover main body 18. The visor rim 14 includes a rim main body 28. In the same way as in the visor cover 12, the rim main body 28 is formed of a synthetic resin material which becomes rigid after curing, and is formed in a circular shape so that a part of an outer peripheral configuration thereof corresponds to the outer peripheral configuration of the cover main body 18. The rim main body 28 is mounted to the cover main body 18 of the visor cover 12 so that an open end 24 of the rim main body 28 opposes the open end 20 of the cover main body 18. A fitting portion 26 is formed at the open end 24 of the rim main body 28 and is thinner than other portions of the rim main body 28 near the open end 24. The outer diameter of the fitting portion 26 is substantially the same as the inner diameter of the fitting portion 22 described above, and the fitting portion 26 is fitted into the fitting portion 22 such that the outer peripheral surface of the fitting portion 26 faces the inner peripheral surface of the fitting portion 22. In this way, the visor rim 14 is mounted to the visor cover 12.

Here, a surface of the cover main body 18 which opposes the rim main body 28 at a position further toward the outside of the cover main body 18 than the fitting portion 22 is referred to as a main body side opposing surface 30, while a surface of the rim main body 28 which opposes the cover main body 18 at a position further toward the outside of the rim main body 28 than the fitting portion 26 is referred to as a circular portion side opposing surface 32. When the cover main body 18 and the rim main body 28 are connected to each other by fitting the fitting portion 26 into the fitting portion 22, the main body side opposing surface 30 and the circular portion side opposing surface 32 oppose each other. Further, in a state in which the cover main body 18 and the rim main body 28 are connected to each other by fitting the fitting portion 26 into the fitting portion 22, a clearance 34 which is open in the substantially upward direction of the vehicle, i.e., open to the surface of the visor 16, is formed between the main body side opposing surface 30 and the circular portion side opposing surface 32. Essentially, it is preferable if the clearance 34 is not formed. However, as described above, the visor cover 12 and the visor rim 14 are formed of synthetic resin material, and therefore, the clearance 34 is formed due to dimensional errors of molds used for molding, shrinkage during molding, or the like.

A mirror 38 is accommodated within the cover main body 18 and the rim main body 28. The mirror 38 is disposed near the rim main body 28 in such a manner that the reflective surface thereof faces substantially toward an open end 36 of the rim main body 28. Moreover, the mirror 38 is supported by a support (not shown) accommodated within the visor 16. Further, a driving means (not shown) such as one or plural motors is accommodated within the visor 16. The orientation of the reflective surface can be appropriately changed by the driving means rotating the support in two axial directions, i.e., in the substantially vertical direction and the substantially longitudinal direction of the vehicle.

As shown in FIGS. 2 and 3, a connecting portion 40 is formed at a side of the cover main body 18 toward the inside of the vehicle compartment when the door mirror 10 is mounted to the vehicle body 17 along the substantially transverse direction of the vehicle.

Figure 1:
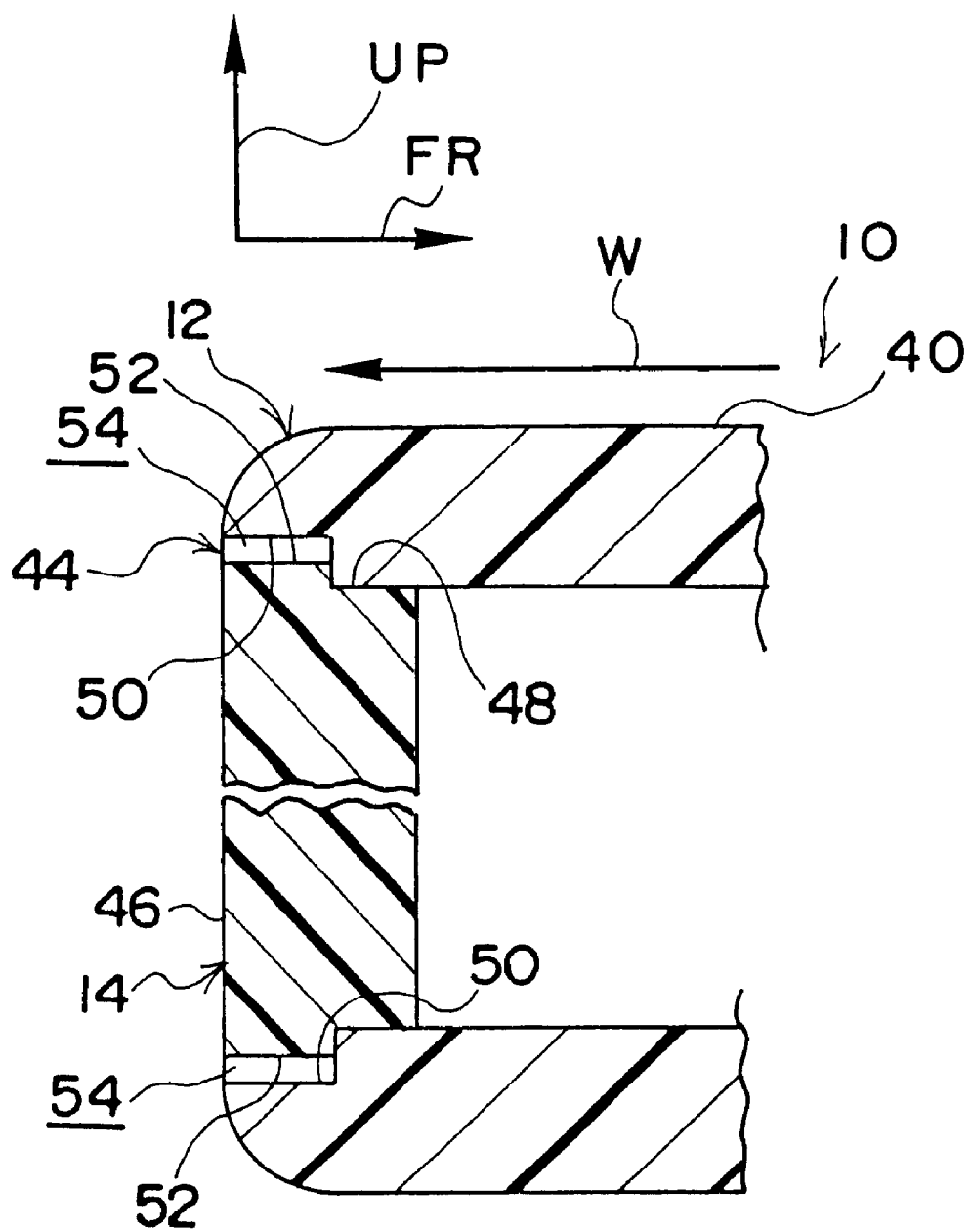
FIG. 1 is a cross-sectional view of a main portion of a mirror according to a first embodiment of the present invention.

As shown in FIG. 1, the connecting portion 40 is formed integrally with the cover main body 18, and is formed in a shape of a gutter which is open in the same direction as that of the open end 20 of the cover main body 18. A cord or the like which electrically connects the driving means for changing the orientation of the mirror 38 to a battery (none of these are shown) provided at the vehicle is accommodated within the connecting portion 40.

Further, the dimension of the connecting portion 40 in the substantially vertical direction of the vehicle is smaller than the dimension of the cover main body 18 in the substantially vertical direction of the vehicle. As shown in FIG. 2, the connecting portion 40 is not formed above the substantially vertical direction middle portion of the cover main body 18. For this reason, when the door mirror 10 is mounted to the vehicle body 17, space 42 approximately corresponding to the connecting portion 40 is formed between the side of the cover main body 18 toward the vehicle body 17 and the vehicle body 17, a door panel of the vehicle, or the like.

Furthermore, as shown in FIG. 1, a step is formed between an open end 44 of the connecting portion 40 and a part of the connecting portion 40 further toward the bottom of the connecting portion 40 than the open end 44, and the inner diameter of the connecting portion 40 at the open end 44 is larger than that at the bottom. A lid 46 formed integrally with the rim main body 28 of the visor rim 14 is fitted into the open end 44 and thereby closes it. Unlike the rim main body 28, the lid 46 is substantially plate-shaped. One side of the lid 46 in a thickness direction serves as a fitting portion 48 which is fit together with the connecting portion 40 at a side further toward the bottom of the connecting portion 40 than the aforementioned step of the connecting portion 40. Moreover, a connecting portion side opposing surface 50 which is an inner peripheral surface of the connecting portion 40 near the open end 20, and a lid side opposing surface 52 which is an outer peripheral surface of the lid 46 oppose each other in a direction orthogonal to the substantially longitudinal direction of the vehicle (in the substantially vertical direction of the vehicle in FIG. 1). An opposing portion 54 which is a boundary between the connecting portion 40 and the lid 46 is exposed at a surface of the visor 16 toward the substantial rear of the vehicle.

In the cover main body 18 of the visor cover 12, the main body side opposing surface 30 is oriented to the rear of the vehicle in the substantially longitudinal direction thereof. However, the visor cover 12 is structured in such a manner that, by a portion of the main body side opposing surface 30 near the connecting portion side opposing surface 50 being curved or twisted, the main body side opposing surface 30 is connected to the connecting portion side opposing surface 50, and the connecting portion side opposing surface 50 is thereby made to oppose the lid side opposing surface 52 in the substantially vertical direction of the vehicle.

Moreover, an extremely small clearance 54 which is open toward the substantial rear of the vehicle may be formed between the connecting portion side opposing surface 50 and the lid side opposing surface 52. Essentially, it is preferable if the clearance 54 is not formed. However, as described above, the visor cover 12 and the visor rim 14 are formed of synthetic resin material, and therefore, the clearance 54 is formed due to dimensional errors of molds used for molding, shrinkage during molding, or the like.

Operation and Effects of First Embodiment

Operation and effects of the present first embodiment will be described hereinafter.

During traveling of a vehicle, air flow W flows over the surface of the vehicle body 17 and the surface of the visor 16. Specifically, when the door mirror 10 is mounted to the vehicle body 17 so as to extend in the substantially transverse direction of the vehicle, air flow W which flows along the side of the visor 16 toward the vehicle body 17 flows above the connecting portion 40. Further, air flow W which flows along the side of the vehicle body 17 also flows over the connecting portion 40. In other words, the space 42 above the connecting portion 40 is, so to speak, a valley formed between the visor 16 and the vehicle body 17, and therefore, air flow W concentrates on the space 42.

As described above, in the door mirror 10, the visor 16 is basically structured by combining two members, i.e., the visor cover 12 and the visor rim 14. Further, these members are molded products made of synthetic resin material. Therefore, dimensional errors are caused due to shrinkage or the like during molding, and a step is formed at the opposing portion 58 described above. As a result, irregularities, although slight, are formed on the surface of the visor 16.

As described above, in the door mirror 10, the opposing portion 58 is exposed at the open end of the connecting portion 40 toward the substantially rear of the vehicle, i.e., at the surface of the visor 16 near the connecting portion 40 toward the substantial rear of the vehicle. Therefore, even if aforementioned irregularities are formed, they are formed at the end portion of the connecting portion 40 toward the substantial rear of the vehicle. Accordingly, the respective surfaces of the connecting portion 40 toward the substantially upward and downward directions of the vehicle are solely formed by the surface of the connecting portion 40. As a result, smooth surfaces having no irregularities or extremely small and little irregularities are formed. Moreover, the clearance 54 described above does not become wide at the connecting portion 40 in the substantially vertical direction of the vehicle.

Therefore, air flow W flows smoothly without the direction in which air flow W flows being rapidly changed over the surface of the connecting portion 40 or without generating turbulence within the clearance 54. As a result, noise such as wind sound generated near the connecting portion 40 can be reduced or eliminated.

Moreover, since the connecting portion 40 is connected to the vehicle body 17, the connecting portion 40 is disposed closer to the vehicle body 17 and therefore to the driver's seat or the passenger seat than the cover main body 18. For this reason, by reducing or eliminating noise which is originally generated near the driver's seat or the passenger seat, a passenger sitting on the driver's seat or the passenger seat feels that noise is extremely small. Therefore, the performance of the door mirror 10 regarding silence felt by passengers is significantly improved.

Although the mirror assembly according to the present invention is applied to the door mirror 10 in the present embodiment, other mirror assemblies may be applied to the door mirror 10 as long as they are provided outside the vehicle compartment such as fender mirrors. However, considering that the position at which the door mirror 10 is provided is near the driver's seat or the passenger seat, noise originally generated near the driver's seat or the passenger seat is reduced or eliminated by applying the present invention to the door mirror 10. Particularly, the performance of the door mirror 10 regarding silence near the driver's seat of the passenger seat can be improved.

Structure of Second Embodiment

A second embodiment of the present invention will be described hereinafter.

Figure 5:
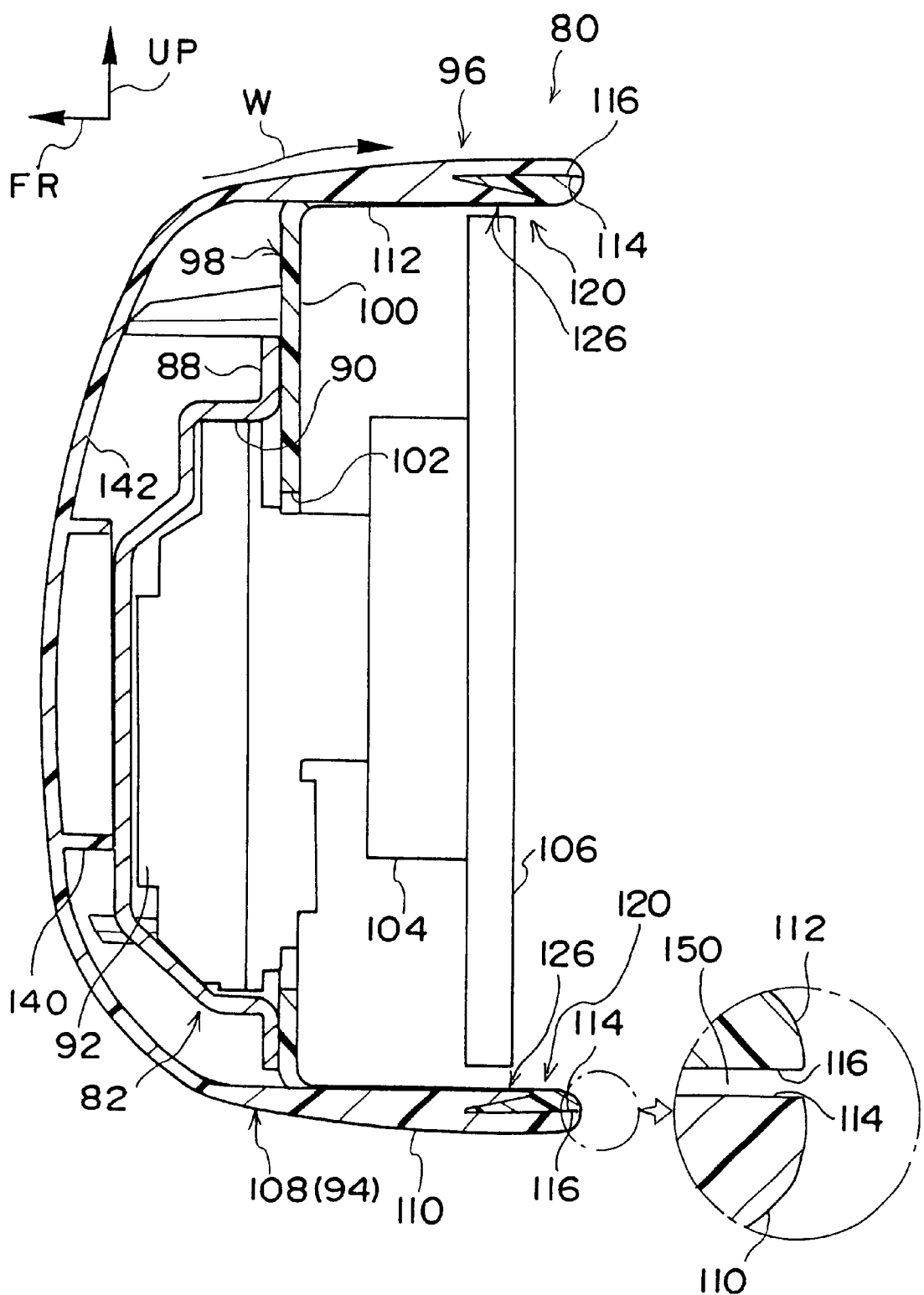
FIG. 5 is a cross-sectional view of a mirror according to a second embodiment of the present invention.
Figure 7:
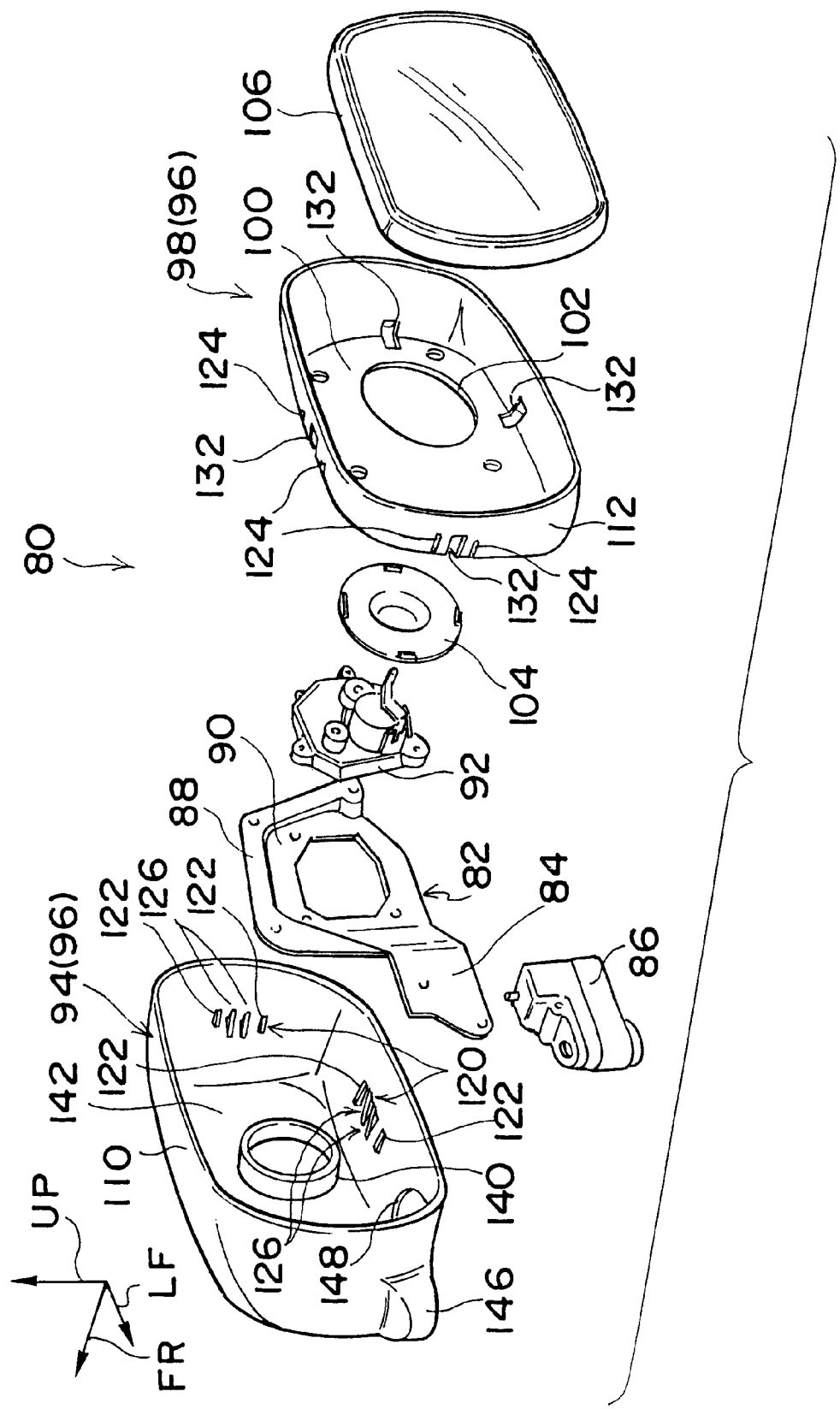
FIG. 7 is an exploded perspective view of the mirror according to the second embodiment of the present invention.

FIG. 7 is an exploded perspective view of the structure of a door mirror 80 serving as a mirror assembly according to the present second embodiment, while FIG. 5 is a cross-sectional view of the structure of the door mirror 80.

As shown in these figures, the door mirror 80 includes a frame 82 formed of a hard member such as metal. As shown in FIG. 7, the frame 82 includes a connecting portion 84. The connecting portion 84 is plate-shaped, and a thickness direction thereof coincides with the substantially longitudinal direction of the vehicle. An actuator 86 for retracting the mirror is disposed at one side of the connecting portion 84 in the thickness direction. The actuator 86 includes a driving means such as a motor. The connecting portion 84 is mechanically connected to the actuator 86 by a fastening means such as a screw. When a driving force is transmitted to the connecting portion 84 from the actuator 86, the connecting portion 84 is rotated by a predetermined angle around an axis which extends in the substantially vertical direction of the vehicle. The actuator 86 is mechanically connected and fixed to a stay main body (not shown) provided at the vehicle body. With this structure, the frame 82 to which a driving force has been applied from the actuator 86 is rotated by a predetermined angle relative to the stay main body, i.e., the vehicle body.

A supporting portion 88 which forms the frame 82 together with the connecting portion 84 is formed integrally with the connecting portion 84. An accommodating portion 90 which is concave in shape and is open toward the substantial rear of the vehicle is formed at the supporting portion 88. The accommodating portion 90 is fastened to the supporting portion 88 by a fastening means such as bolts or screws in such a manner that a portion of the actuator 92 at the side toward the substantial front of the vehicle, which actuator 92 drives the mirror in a pivotal manner, is accommodated in the accommodating portion 90.

Further, a visor rim 98 which forms a visor 96 together with a visor cover 94 which will be described later is disposed at the supporting portion 88 at the side toward the substantial rear of the vehicle. The visor rim 98 is made of a synthetic resin material and is formed in a shape of a cup having a shallow base. A depth direction of the visor rim 98 coincides with the substantially longitudinal direction of the vehicle, and the visor rim 98 has an open end toward the substantial rear of the vehicle. Moreover, unlike the visor rim 14 in the above-described first embodiment, the lid 46 is not formed at the visor rim 98. If the visor rim 98 needs to be described in correspondence with the first embodiment described above, the visor rim 98 is formed solely by the rim main body 28 of the visor rim 14.

A penetration hole 102 is formed in a bottom portion 100 of the visor rim 98, and a portion of the above-described actuator 92 toward the substantial rear of the vehicle passes from the outer side of the visor rim 98 (i.e., from a rear surface side of the bottom portion 100) through the penetration hole 102 into the visor rim 98. The supporting portion 88 of the frame 82 described above is fastened and fixed to the rear surface of the bottom portion 100 by a fastening means such as bolts or screws.

A substantially disc-shaped holder 104 is accommodated within the visor rim 98. The holder 104 is mechanically connected to a portion of the actuator 92 which has passed through the penetration hole 102. When a driving force is applied to the holder 104 from a driving means such as one motor or plural motors provided at the actuator 92, the holder 104 is rotated by a predetermined angle around two axes which respectively extend in the substantially vertical direction and substantially transverse direction of the vehicle. Further, a mirror 106 is provided at the side of the holder 104 opposite to the actuator 92. The mirror 106 has a reflective surface at a side opposite to the holder 104, i.e., at the side toward the substantial rear of the vehicle, and the rear surface of the reflective surface is fixed to the holder 104. Accordingly, the mirror 106 is driven in a pivotal manner by the pivotal motion of the holder 104, and in this way, a reflection angle of the reflective surface of the mirror 106 can be appropriately changed or adjusted.

The supporting portion 88 of the frame 82, the actuators 86 and 92, and the visor rim 98 described above are accommodated within the cover main body 108 forming the visor cover 94. The cover main body 108 is made of a synthetic resin material and is integrally formed in a shape of a cup or a dome which is open toward the substantial rear of the vehicle. An inner peripheral configuration of a surrounding wall 110 of the cover main body 108 is substantially the same as an outer peripheral configuration of a surrounding wall 112 of the visor rim 98 described above.

As shown in FIG. 7, basically, the surrounding walls 110 and 112 oppose each other to their open ends along a radial direction thereof. For this reason, a cover side opposing surface 114 which is an inner peripheral portion of the surrounding wall 110 and a rim side opposing surface 116 which is an outer peripheral portion of the surrounding wall 112 oppose each other in a direction substantially orthogonal to the direction in which the surrounding walls 110 and 112 are open. As a result, an opposing portion 118 which is a boundary between the surrounding wall 110 (the visor cover 94) and the surrounding wall 112 (the visor rim 98) becomes exposed at a surface of the visor 96 at the open end thereof (i.e., at a surface of the visor 96 toward the substantial rear of the vehicle or at an end portion of the visor 96 toward the substantial rear of the vehicle).

Figure 8:
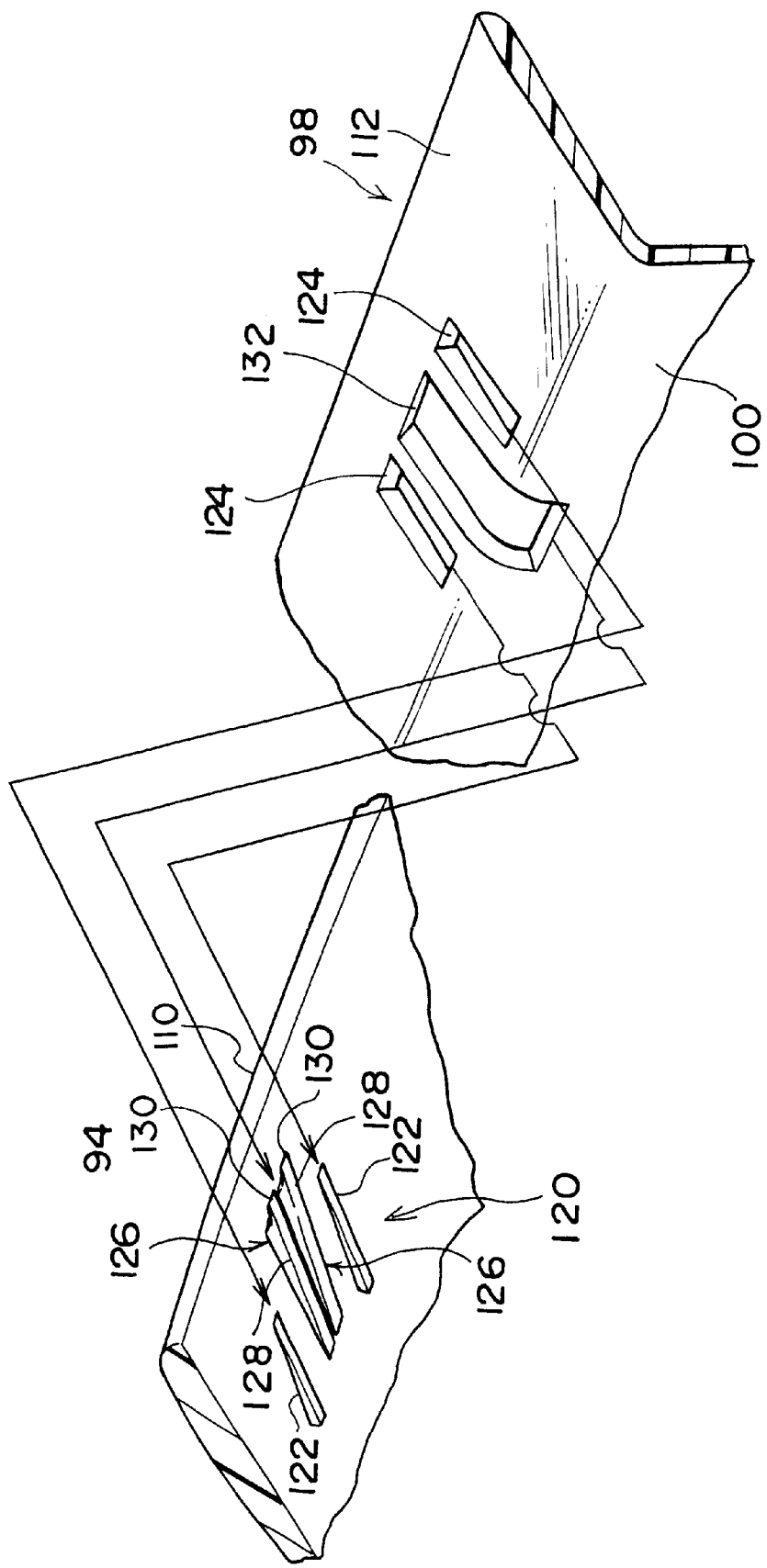
FIG. 8 is an enlarged perspective view of a connecting means.
Figure 9:
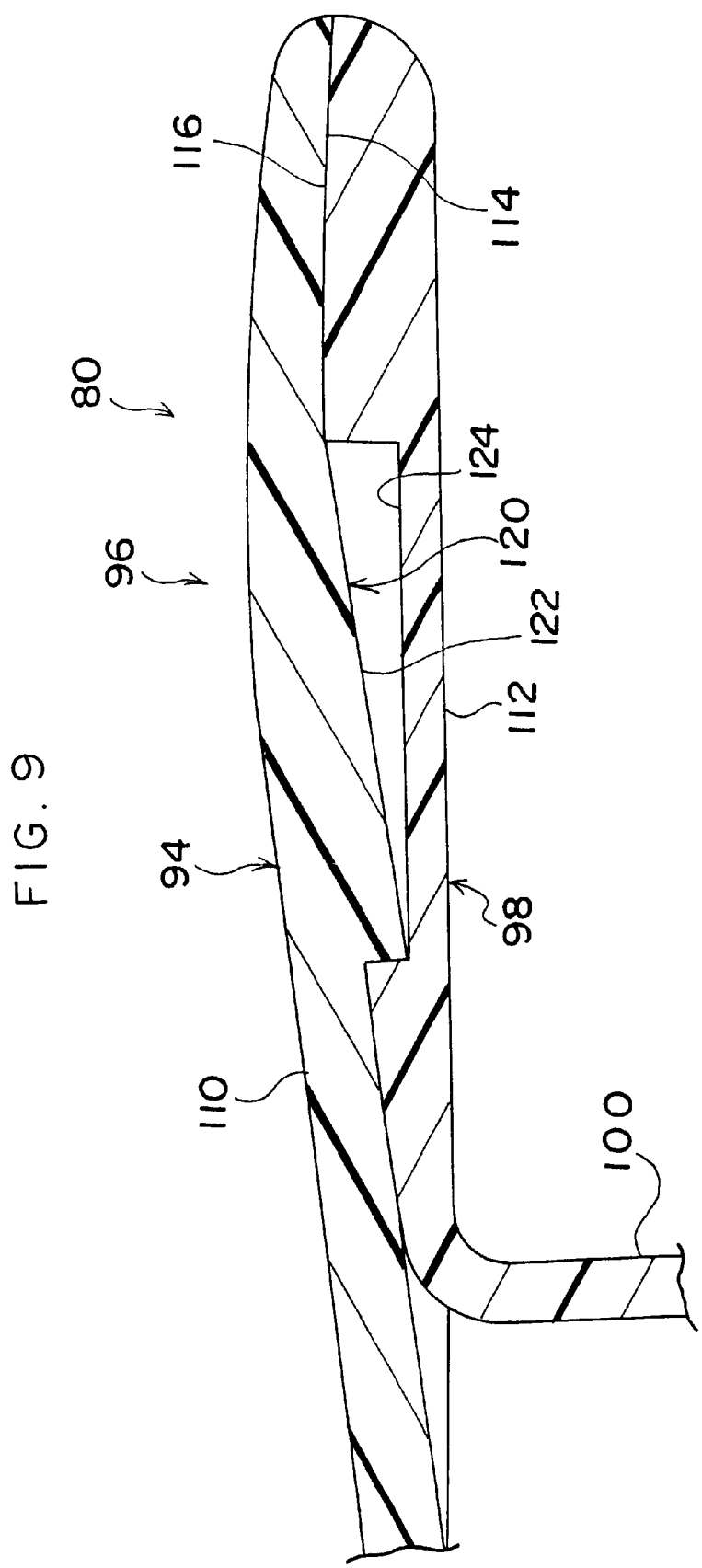
FIG. 9 is an enlarged cross-sectional view of a fitting claw.

Further, as shown in FIG. 7, a connecting portion 120 which serves as a connecting means is formed at the inner peripheral portion of the surrounding wall 110 near the open end. As shown in FIG. 8, the connecting portion 120 includes a pair of fitting claws 122. Moreover, as shown in FIG. 9, each of the fitting claws 122 is formed in a substantially triangular plate-like configuration, and the width of the fitting claw 122 gradually becomes shorter toward the substantial rear of the vehicle. A thickness direction of the fitting claw 122 coincides with a circumferential direction of the surrounding wall 110, and the fitting claws 122 are disposed so as to oppose each other along the thickness direction. A fitting groove 124 which corresponds to the fitting claw 122 is formed at the outer peripheral portion of the surrounding wall 112 of the visor rim 98. As shown in FIG. 9, by the fitting claw 122 fitting into the fitting groove 124, a portion of an inner wall of the surrounding wall 124 toward the substantially rear side of the vehicle opposes the fitting claw 122. When an attempt is made to move the surrounding wall 112 (i.e., the visor rim 98) toward the substantial rear of the vehicle relative to the surrounding wall 110 (i.e., the cover main body 108), the fitting claw 122 interferes with inner walls of the fitting groove 124.

As shown in FIG. 8, a pair of slip-off prevention claws 126 which form the connecting portion 120 together with the fitting claws 122 are formed between the fitting claws 122. In the same way as in the fitting claws 122, the slip-off prevention claws 126 are respectively formed in a shape of a plate whose thickness direction coincides with the circumferential direction of the surrounding wall 110 and are provided so as to oppose each other in the thickness direction.

Figure 10:
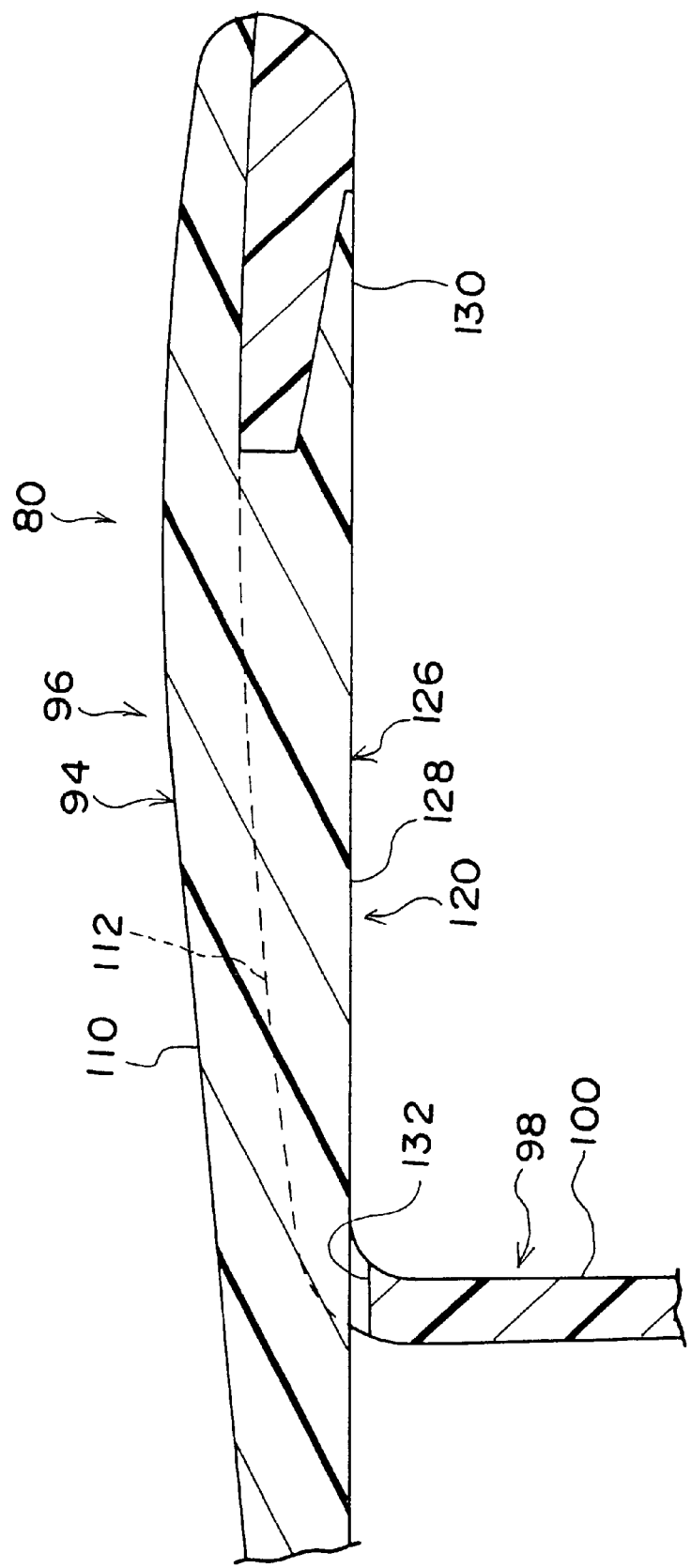
FIG. 10 is an enlarged cross-sectional view of a slip-off prevention claw.

As shown in FIG. 10, the slip-off prevention claw 126 is structured with a base portion 128 and a claw portion 130. The base portion 128 is formed in a substantially triangular shape, and the width of the base portion 128 gradually becomes shorter toward the substantial front of the vehicle. The claw portion 130 is located further inside from the surrounding wall 110 and protrudes from an end portion of the base portion 128 toward the substantial rear of the vehicle.

An insertion hole 132 corresponding to the slip-off prevention claws 126 is formed in the surrounding wall 112. As shown in FIG. 10, the insertion hole 132 is formed at a portion extending from the surrounding wall 112 to the bottom portion 100, and is structured so that the base portion 128 and the claw portion 130 of each of the slip-off prevention claws 126 are inserted into the insertion hole 132. In a state in which the slip-off prevention claws 126 are inserted into the insertion hole 132, the surrounding wall 112 of the visor rim 98 is held between the claw portions 130 and the surrounding wall 110 of the cover main body 108. Further, in this state, a part of an inner peripheral portion of the insertion hole 132 toward the substantial front of the vehicle faces an end portion of each of the base portions 128 toward the substantial rear of the vehicle. When an attempt is made to move the surrounding wall 112 (i.e., the visor rim 98) toward the substantial front of the vehicle relative to the surrounding wall 110 (i.e., the cover main body 108), the base portions 128 interfere with the inner peripheral portion of the insertion hole 132.

A plurality of sets each including the above-described fitting claws 122 and the slip-off prevention claws 126 are formed at the surrounding wall 110 along the inner peripheral direction thereof at predetermined intervals. Further, a plurality of sets each having the fitting grooves 124 and the insertion hole 132 are correspondingly formed in the surrounding wall 112 at predetermined intervals.

As shown in FIG. 7, a reinforcing rib 140 is formed inside the cover main body 108. Unlike conventional ribs which are made by molding a synthetic resin material and are formed in a substantially grid-like configuration, the reinforcing rib 140 is formed in the shape of a cylinder whose axial direction coincides with the substantially longitudinal direction of the vehicle. An end portion of the reinforcing rib 140 toward the substantial front of the vehicle is connected to a substantial center of a bottom portion 142 of the cover main body 108.

Moreover, as shown in FIG. 7, the cover main body 108 includes an actuator accommodating portion 146 which forms the visor cover 94 together with the cover main body 108. Although the actuator accommodating portion 146 corresponds to the connecting portion 40 of the first embodiment, it is substantially a part of the surrounding wall 110. The interior of the actuator accommodating portion 146 is connected to the interior of the cover main body 108. The actuator 86 and the connecting portion 84 of the frame 82 described above are accommodated in the actuator accommodating portion 146.

Further, a penetration hole 148 is formed in a part of the actuator accommodating portion 146 and the surrounding wall 110 so that the actuator 86 and the frame 82 pass through the penetration hole 148 and are accommodated within the actuator accommodating portion 146 (i.e., the visor cover 94). The penetration hole 148 is closed by the stay main body of the vehicle body when the door mirror 80 is mounted thereto.

Operation and Effects of Second Embodiment

Next, operation and effects of the present second embodiment will be described.

As is the case with the first embodiment, as shown in FIG. 5, air flow W flows over the surface of the visor cover 94 from the substantial front of the vehicle toward the substantial rear of the vehicle. However, in the door mirror 80, the surrounding wall 110 of the visor cover 94 and the surrounding wall 112 of the visor rim 98 oppose each other in a range extending to the open ends thereof in a direction substantially orthogonal to the direction in which the surrounding walls 110 and 112 are open. Therefore, the opposing portion 118 is exposed at the open end of the visor 96 (i.e., at the surface of the visor 96 toward the substantial rear of the vehicle or at the end portion of the visor 96 toward the substantial rear of the vehicle). Accordingly, even if dimensional errors are caused at the surrounding walls 110 and 112 by shrinkage or the like during molding and steps (irregularities) are thereby formed at the opposing portion 118 between the surrounding wall 110 and the surrounding wall 112, or a clearance 150 shown in a circle in an alternate long and short dash line in FIG. 5 is formed, the clearance 150 extends toward the substantial rear of the vehicle.

In this way, since the outer peripheral surface (i.e., the surface over which air flow W passes) of the visor 96 is formed solely by the surface of the visor cover 94, the outer peripheral surface of the visor 96 is a smooth surface having no irregularities or having little and small irregularities, and therefore, air flow W smoothly flows over the outer peripheral surface of the visor 96. As a result, noise such as so-called "wind noise" can be reduced or eliminated.

Figure 6:
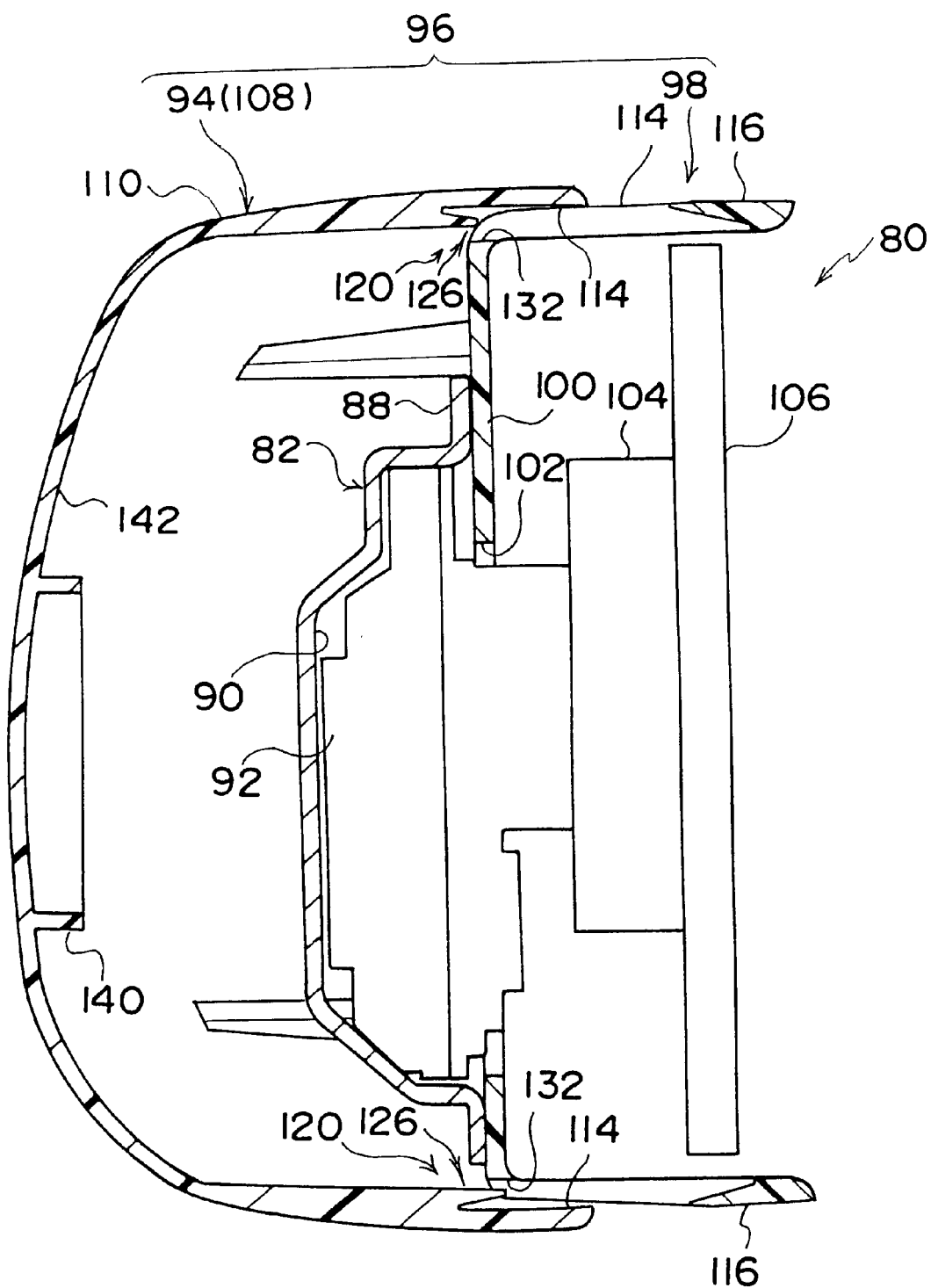
FIG. 6 is a cross-sectional view which corresponds to FIG. 5 and shows a state in which the connection between a visor cover and a visor rim is released.

Further, as described above, in the door mirror 80, the actuator 92 is incorporated into the frame 82, and the frame 82 is assembled to the visor rim 98. Furthermore, the mirror 106 is assembled to the actuator 92 via the holder 104. The visor cover 94 is not directly assembled to the frame 82 or the actuator 92, but is indirectly assembled to the frame 82 via the visor rim 98. Moreover, the visor cover 94 is connected to the visor rim 98 by respectively engaging the fitting claws 122 and the slip-off prevention claws 126, which are formed near the open end of the surrounding wall 110 of the visor cover 94, with the fitting grooves 124 and the insertion hole 132 formed in the visor rim 98. Further, since the fitting claws 122 are formed outside the slip-off prevention claws 126 in the circumferential direction of the surrounding wall 110, fitting of the fitting claws 122 in the fitting grooves 124 can be easily released by pulling the surrounding wall 110 in a radially outward direction. Once fitting of all of the fitting claws 122 and the fitting grooves 122 is released, the connection between the visor cover 94 and the visor rim 98 can be easily released only by pulling the visor cover 94 toward the substantial front of the vehicle (i.e., a state shown in FIG. 6).

Figure 15:
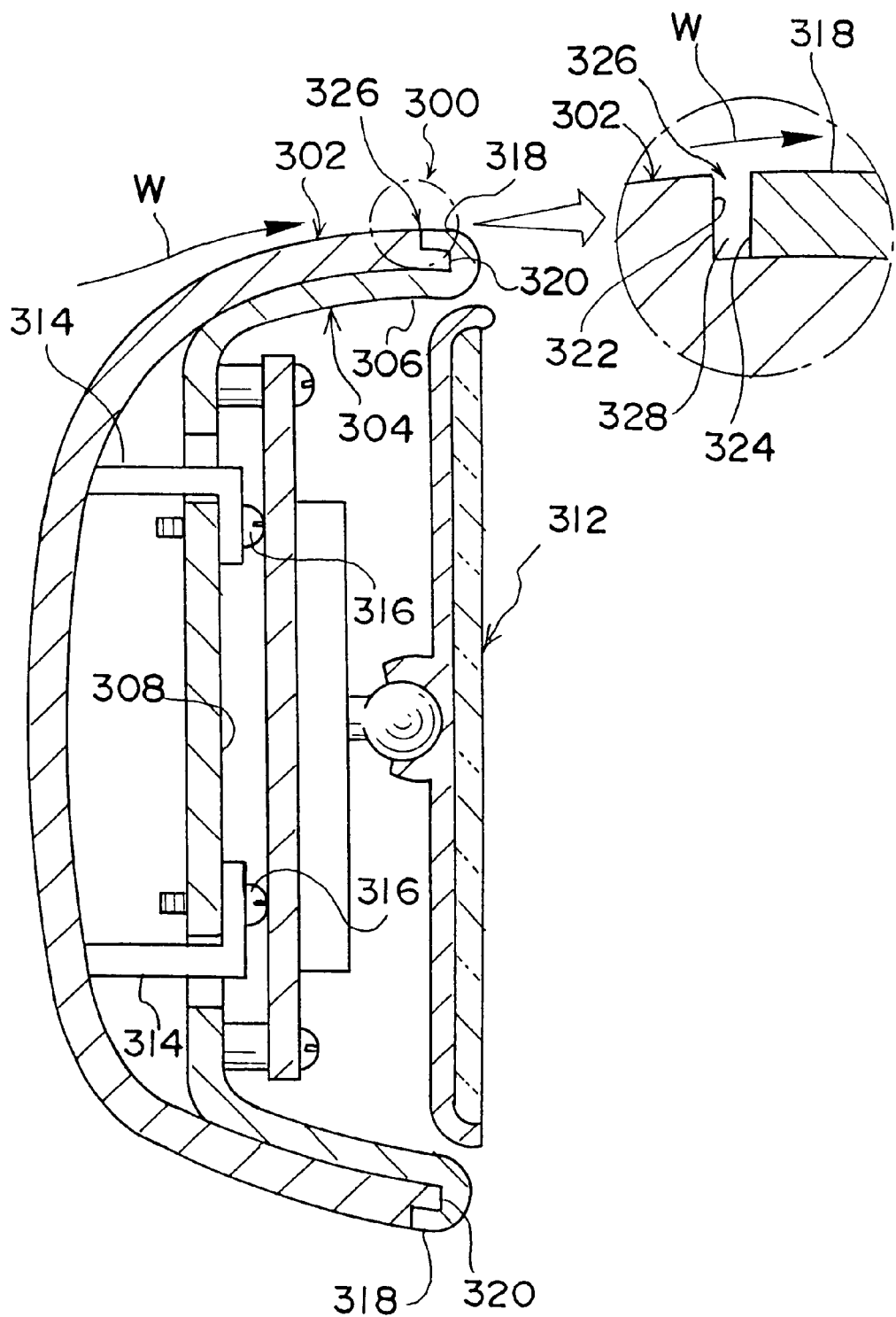
FIG. 15 is a cross-sectional view of a conventional mirror.

For example, if the door mirror has a structure such as the door mirror 300 disclosed in the above-described JP-Y No. 4-33157 (hereinafter, see FIG. 15 with regard to the door mirror 300) in which the hook-shaped mounting pieces 314 formed so as to protrude from the inner side of the bottom of the visor cover 302 pass through the bottom portion 308 of the visor rim 304 and then the mounting pieces 314 and the bottom portion 308 of the visor rim 304 are fastened together by the screws 316, basically, the respective members such as the mirror 312 and the like need to be assembled to the visor rim 304 after the visor rim 304 has been assembled to the visor cover 302, and the visor cover 302 cannot be removed from the visor rim 304 without removing the mirror 312 and the like from the visor rim 304.

Since the surfaces of the visor covers 94 and 302 are exposed to the exterior, scratches or the like are formed on the surfaces of the visor covers 94 and 302 due to their contact with fences or other vehicles. When such scratches are formed on the visor covers 94 and 302, only the visor covers 94 and 302 may be replaced. However, in the structure of the door mirror 300, when the visor covers 94 and 302 are replaced, all of the parts such as the mirror 312 and the like need to be removed from the visor rim 304 so that the screws 316 can be removed from the visor rim 304.

On the other hand, in the door mirror 80, the visor cover 94 can be easily removed from the visor rim 98 only by releasing the engagement of the fitting claws 122 with the fitting grooves 124 and the engagement of the slip-off prevention claws 126 with the insertion hole 132 while an appropriate external force is applied to the visor cover 94 made of a synthetic resin material so that the surrounding wall 110 is elastically deformed. Conversely, the visor cover 94 can be connected to the visor rim 98 only by fitting the visor rim 98 into the visor cover 94 while the surrounding wall 110 of the visor cover 94 is elastically deformed. In this way, in the door mirror 80, the visor cover 94 can be easily removed from the visor rim 98 without removing the parts such as the frame 82, the mirror 106, and the like from the visor rim 98. Similarly, assembly can be easily carried out. Therefore, a user can carry out the above-described replacement of the visor cover 94 in a simple manner.

Further, in the door mirror 80, the visor cover 94 is connected to the visor rim 98 only by the engagement of the fitting claws 122 with the fitting grooves 124 and the engagement of the slip-off prevention claws with the insertion hole 132. However, the fitting claws 122 and the slip-off prevention claws 126 are formed at the inner peripheral portion of the surrounding wall 110 in the circumferential direction, while the fitting grooves 124 and the insertion hole 132 are respectively formed so as to correspond to the fitting claws 122 and the slip-off prevention claws 126. Therefore, external force which removes the visor cover 94 from the visor rim 98 acts on and is distributed to the respective fitting claws 122 and slip-off prevention claws 126 provided at the respective positions of the visor cover 94. As a result, the visor cover 94 can be firmly connected to the visor rim 98 without setting high mechanical strength for the fitting claws 122 and slip-off prevention claws 126 high.

Moreover, in the door mirror 300 disclosed in JP-Y No. 4-33157, since the mounting pieces 314 are fastened and thus connected to the bottom portion 308 of the visor rim 304 by the screws 316, the strength of the visor cover 302 at the open end side is compensated by disposing the marginal portion 320 between the surrounding wall 306 and the toroidal surrounding wall 318. However, in the door mirror 80, as described above, formation of the toroidal surrounding wall is not necessary since the visor cover 94 and the visor rim 98 are firmly connected to each other near the open end of the visor cover 94. Accordingly, the rim side opposing surface 324 of the surrounding wall 318 and the cover side opposing surface 322 of the visor cover 302 are not formed. In this sense as well, formation of the fitting claws 122 and the slip-off prevention claws 126 at the surrounding wall 110 near the open end thereof contributes to reduction in or elimination of noise such as wind noise.

As described above, in the door mirror 80, since the visor cover 94 and the visor rim 98 are firmly connected to each other near the open end of the visor cover 94, the strength of the visor 96 at the open end side becomes high. Further, since the reinforcing rib 140 which is formed at the inner side of the bottom portion 142 of the visor cover 94 and reinforces the bottom portion 142 of the visor cover 94 is cylindrical, the visor cover 94 has high strength against external force applied from any direction from the exterior of the bottom portion 152 of the visor cover 94. When an external force acts on the visor cover 94 between the bottom portion 142 and the open end of the visor cover 94 from the exterior thereof, compressive stress is applied from a portion of the visor cover 94 on which the external force acts toward the bottom portion 142 and the open end of the visor cover 94. However, as described above, the reinforcing rib 140 increases the mechanical strength of the bottom portion 142 of the visor cover 94, and the mechanical strength of the visor cover 94 at the open end side thereof is increased by the open end being firmly connected to the visor rim 98. Therefore, the visor cover 94 can sufficiently bear such compressive stress, and inadvertent deformation or the like of the visor cover 94 can be prevented.

Structure of Third Embodiment

A third embodiment of the present invention will be described hereinafter.

As for the description of the present third embodiment, portions of the present third embodiment which are basically the same as those of the above-described embodiments are designated by the same reference numerals, and detailed description thereof will be omitted.

Figure 11:
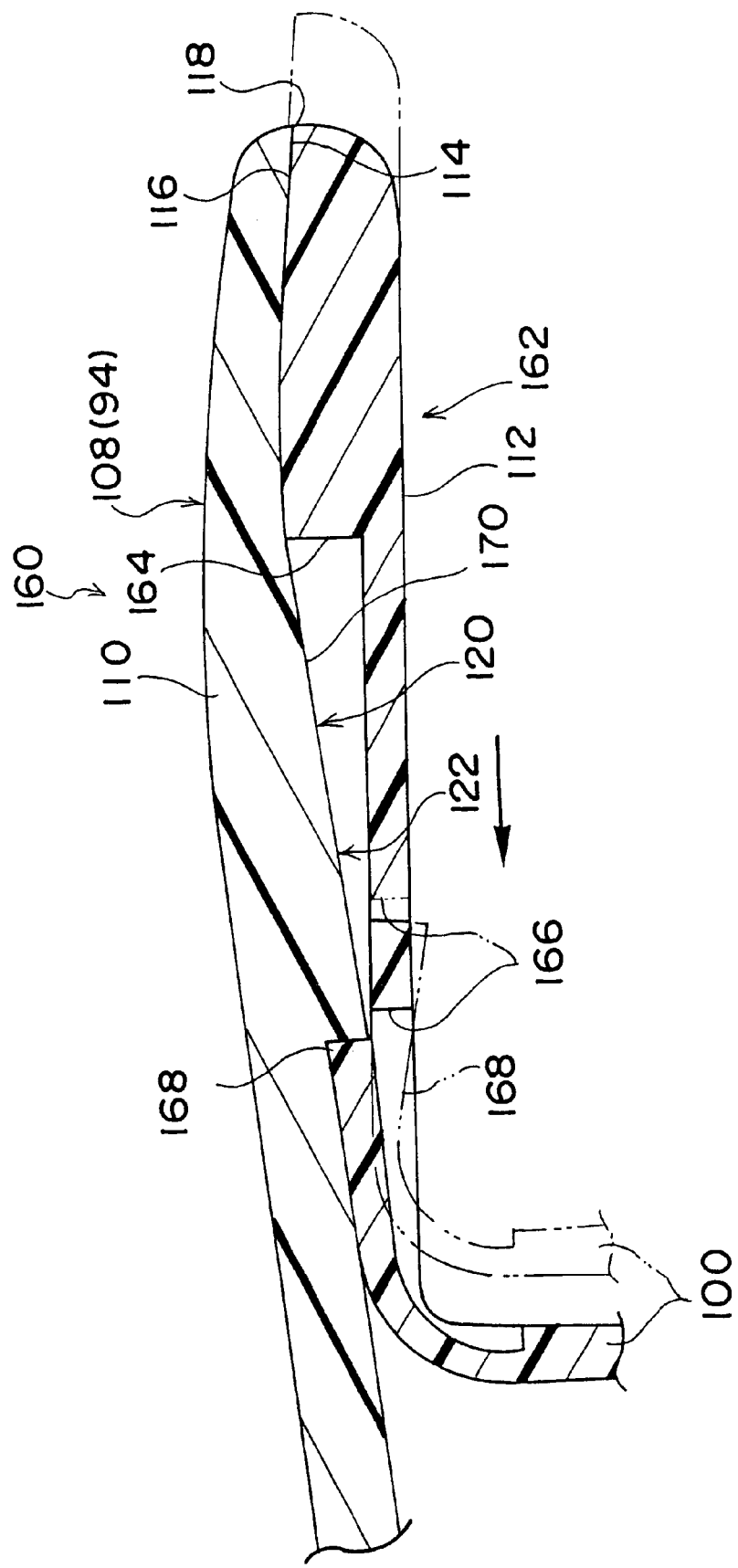
FIG. 11 is a cross-sectional view which corresponds to FIG. 9 and shows an enlarged main portion of a mirror according to a third embodiment of the present invention.

FIG. 11 is a cross-sectional view of the structure of a main portion of a door mirror 160 according to the present third embodiment. As shown in this figure, the door mirror 160 includes a visor rim 162. The basic structure of the visor rim 162 is the same as that of the visor rim 98 in the second embodiment described above except that a fitting grooves 164 are formed at the outer peripheral portion of the surrounding wall 112 in place of the fitting grooves 124. The fitting groove 164 is formed so as to correspond to the fitting claw 122. As shown in FIG. 11, unlike the fitting groove 124, an inner wall of the fitting groove 164 is not formed at the side toward the substantial front of the vehicle and is open toward the substantial front of the vehicle at a portion near a margin of the bottom portion 100. Further, a hole 166 is formed in a part of the bottom portion 100 further toward the substantial front of the vehicle than the middle portion of the vehicle in the longitudinal direction thereof. The exterior and the interior of the surrounding wall 112 communicate with each other through the hole 166.

Figure 12:
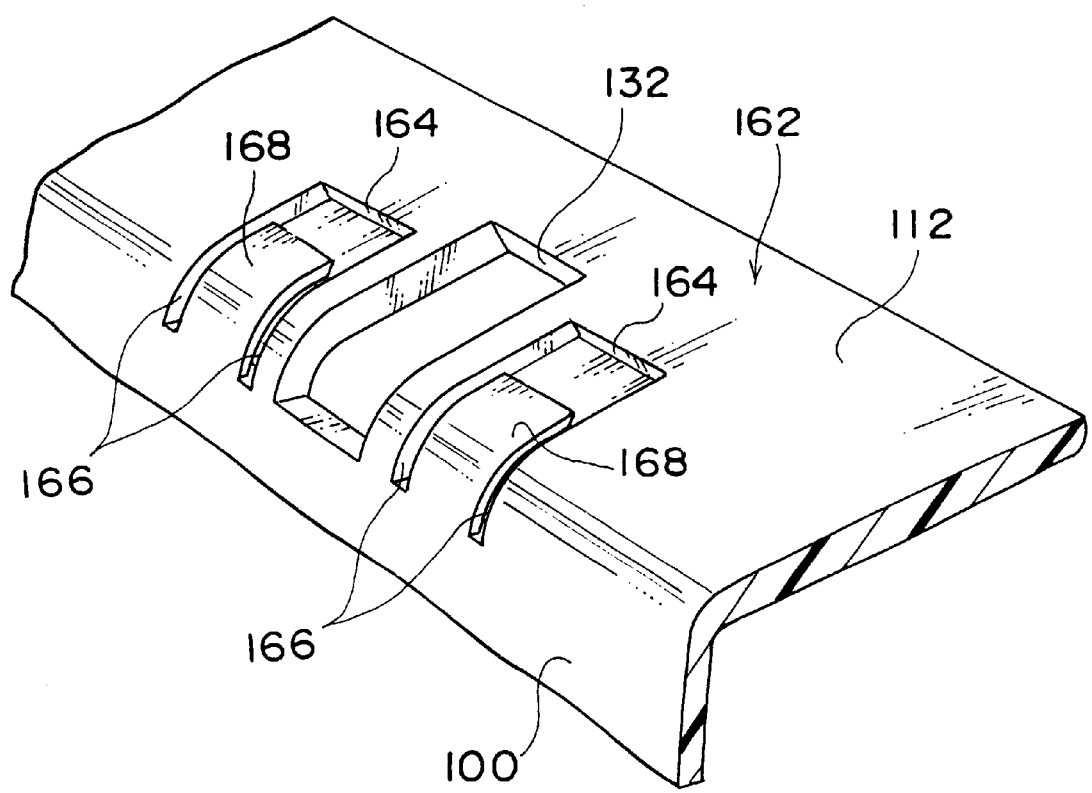
FIG. 12 is a perspective view showing an enlarged main portion of a visor rim of the mirror according to the third embodiment of the present invention.

Moreover, as shown in FIGS. 11 and 12, an elastic piece 168 is formed at the open end of the fitting groove 164 toward the substantial front of the vehicle. The elastic piece 168 extends from the margin of the bottom portion 100 corresponding to the open end of the fitting groove 164, and is curved along the surrounding wall 112 toward a direction in which the surrounding wall 112 is open. As shown in FIG. 11, the thickness of the elastic piece 168 at a curved portion thereof is approximately ½ of the thickness of the bottom portion 100, and the elastic piece 168 extends from a portion further toward the substantial front of the vehicle than the middle part of the bottom portion 100 in a thickness direction. Further, since the curved portion of the elastic piece 168 is thinner than the bottom portion 100, the elastic piece 168 is elastically deformable at the curved portion around an axis whose longitudinal direction coincides with a transverse direction of the elastic piece 168 (see a state of the elastic piece 168 in an alternate long and two short dashes line in FIG. 11). Furthermore, the tip of the elastic piece 168 opposes an end portion of the fitting claw 122 at the side toward the substantial front of the vehicle, which fitting claw 122 is fitted into the fitting groove 164 along the substantially longitudinal direction of the vehicle.

Operation and Effects of Third Embodiment

In the present third embodiment, movement of the visor rim 162 relative to the visor cover 94 toward the substantial rear of the vehicle is limited by the fitting claws 122 interfering with the tips of the elastic pieces 168. Accordingly, the present third embodiment is similar to the second embodiment in that relative movement of the visor rim 162 toward the substantial rear of the vehicle is limited by the fitting claws 122, and the structure of the present third embodiment is the same as that of the second embodiment except for the fitting grooves 164 and the elastic pieces 168. Therefore, basically, the present third embodiment has operation similar to that of the second embodiment and can obtain effects similar to those of the second embodiment.

Further, as described above, the elastic piece 168 can be elastically deformed at the curved portion around its axis whose longitudinal direction coincides with the transverse direction of the elastic piece 168. Furthermore, the tip of the elastic piece 168 is entered into the fitting groove 164 and the hole 166 by being elastically deformed as shown in the alternate long and two short dashes line in FIG. 11. Since the elastic piece 168 can be elastically deformed in this manner, when an inclined surface 170 of the fitting claw 122 interferes with the elastic piece 168 at the time of mounting the visor rim 162 to the inner side of the visor cover 94, the elastic piece 168 is elastically deformed toward the inside of the fitting groove 164 and the hole 166 by a pressing force from the inclined surface 170. In this state, the visor rim 162 is further inserted into the inner side of the visor cover 94 so that the fitting claws 122 are entered into the fitting grooves 164. Once the abutment of the inclined surface 170 against the elastic piece 168 is released, the elastic piece 168 restores to its original position due to the elasticity thereof, and the tip of the elastic piece 168 opposes the end portion of the fitting claw 122 at the side toward the substantial front of the vehicle.

In this way, the visor rim 162 can be easily mounted to the inner side of the visor cover 94 by the elastic pieces 168 being elastically deformed toward the inside of the fitting grooves 164 and the holes 166.

Structure of Fourth Embodiment

Next, a fourth embodiment of the present invention will be described.

Figure 13:
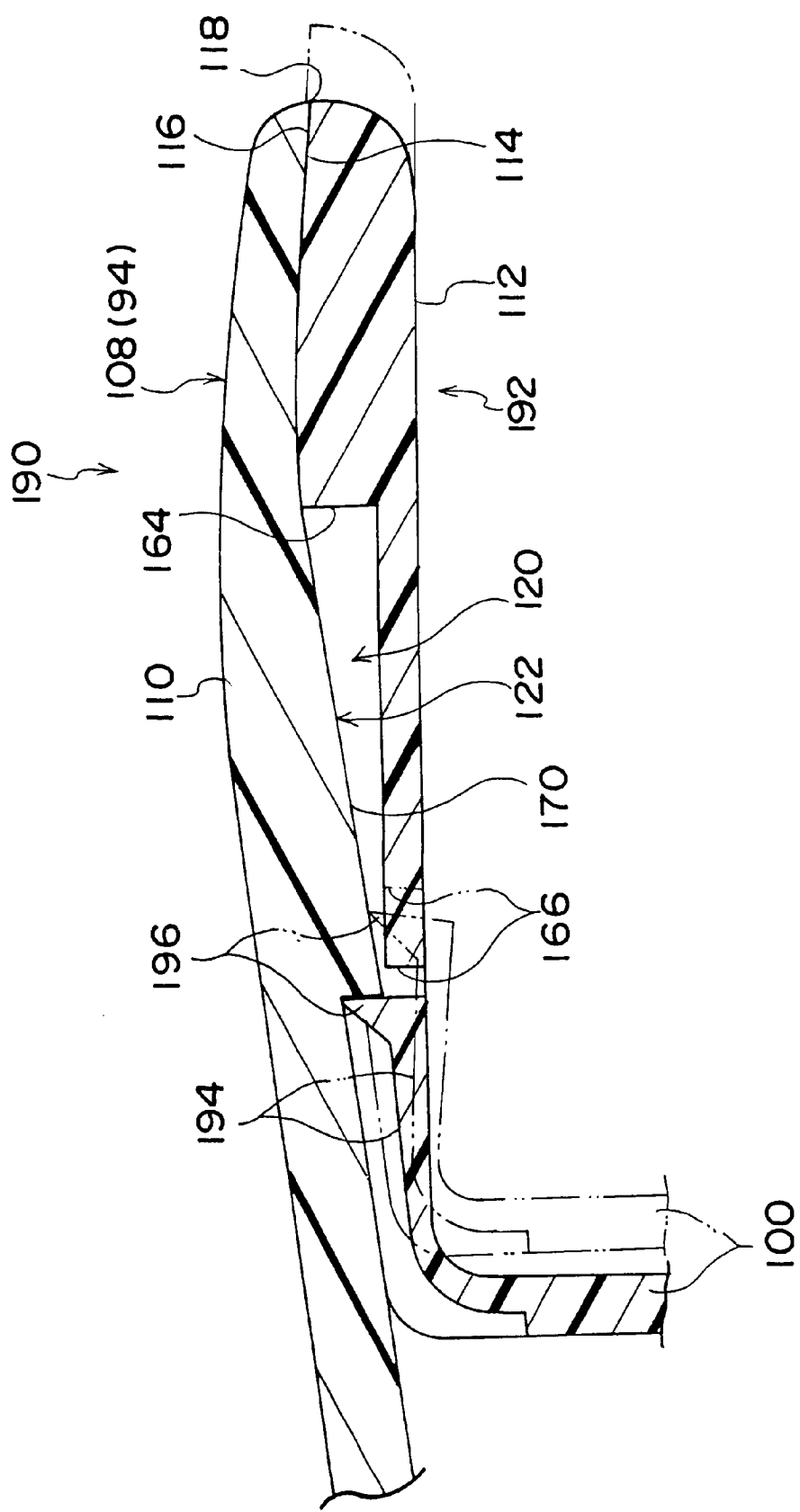
FIG. 13 is a cross-sectional view which corresponds to FIG. 9 and shows an enlarged main portion of a mirror according to a fourth embodiment of the present invention.
Figure 14:
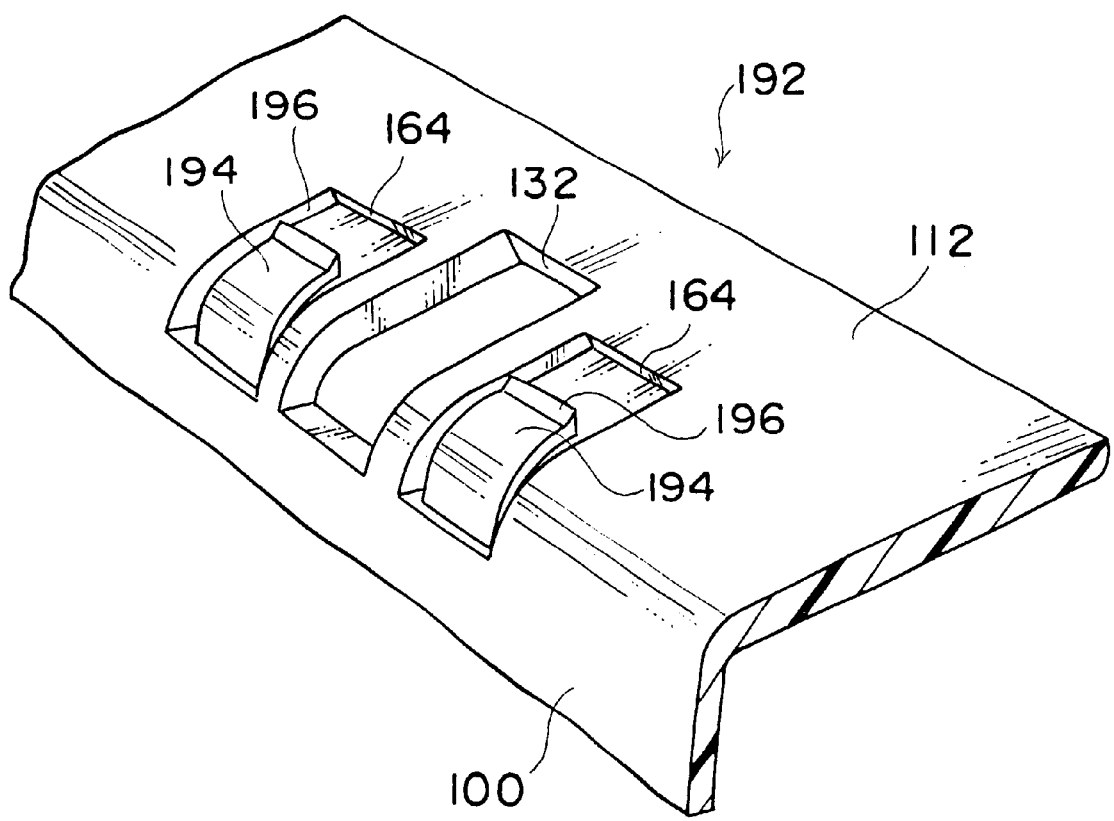
FIG. 14 is a perspective view showing an enlarged main portion of a visor rim of the mirror according to the fourth embodiment of the present invention.

FIG. 13 is a cross-sectional view of the structure of a main portion of a door mirror 190 according to the present fourth embodiment, while FIG. 14 is a perspective view of the appearance of a main portion of a visor rim 192 which is applied to the door mirror 190. As shown in these figures, elastic pieces 194 are provided at the visor rim 192 of the door mirror 190 in place of the elastic pieces 168 in the above-described third embodiment. The present fourth embodiment is similar to the third embodiment in that each of the elastic pieces 194 extends from the margin of the bottom portion 100 corresponding to the open end of the fitting groove 164 and is curved along the surrounding wall 112 toward the direction in which the surrounding wall 112 is open. However, as shown in FIG. 13, the elastic piece 194 has, at a curved portion thereof, a thickness that is approximately ½ of that of the bottom portion 100 and extends from a portion further toward the substantial rear of the vehicle than the middle part of the bottom portion 100 in the thickness direction. Further, as shown in FIG. 13, an engaging portion 196, which is substantially triangular when seen in side view, is formed at the tip of the elastic piece 194. The engaging portion 196 opposes the end portion of the fitting claw 122 toward the substantial front of the vehicle which end portion is entered into the fitting groove 164 along the substantially longitudinal direction of the vehicle.

Operation and Effects of Fourth Embodiment

In the present fourth embodiment, when the visor rim 192 is mounted to the inner side of the visor cover 94, the inclined surface 170 of the fitting claw 122 interferes with the top portion of the engaging portion 196, and by pressing force of the fitting claw 122, the elastic piece 194 is elastically deformed toward the inside of the fitting groove 164 and the hole 166. In this state, the visor rim 192 is further inserted into the visor cover 94 so that the fitting claw 122 is entered into the fitting groove 164. Once the abutment of the inclined surface 170 against the top portion of the engaging portion 196 is released, the elastic piece 194 restores to its original position by its elasticity such that the tip of the elastic piece 194 opposes the end portion of the fitting claw 122 at the side toward the substantial front of the vehicle. In other words, although the elastic piece 194 is different in shape from the elastic piece 168 in the third embodiment, operation of the elastic piece 194 is basically similar to that of the third embodiment. Therefore, basically, effects similar to those of the third embodiment can be obtained in the present fourth embodiment.

What is claimed is:

1. A rearview mirror assembly for a vehicle, comprising:
    (a) a mirror having a rear surface and an outer periphery; and
    (b) a visor which includes a visor cover for covering the rear surface of the mirror and a visor rim for surrounding the outer periphery of the mirror, said visor rim having an annular end portion surrounded by an outer edge;
    (c) wherein the visor cover has an annular end portion having an outer edge which engages with the annular end portion of the visor rim when the visor cover and the visor rim are assembled to each other, and wherein the engagement of the visor cover and visor rim annular end portions with one another forms a loop-shaped opposing portion as a boundary on outside surfaces of the visor cover and visor rim defined between the opposing outer edges of the visor cover and the visor rim, said loop-shaped opposing portion facing a direction towards which a surface of the mirror is oriented.

2. The mirror assembly of claim 1, further comprising an attachment structure for removably assembling the visor rim and the visor cover to each other, provided at a region in which the visor rim annular end portion engages with the visor cover annular end portion.

3. The mirror assembly of claim 2, wherein the attachment structure includes an engaging portion provided at one of the visor rim annular end portion and the visor cover annular end portion, and an engaged portion provided at the other of the visor rim annular end portion and the visor cover annular end portion.

4. The mirror assembly of claim 1, wherein the visor cover annular end portion has an inner peripheral surface and the visor rim annular end portion has an outer peripheral surface, and said peripheral surfaces engage with one another when the visor rim and the visor cover are assembled to each other.

5. The mirror assembly of claim 4, further comprising an attachment structure for removably assembling the visor rim and the visor cover to each other, provided where the inner peripheral surface of the visor cover annular end portion engages with the outer peripheral surface of the visor rim annular end portion.

6. The mirror assembly of claim 5, wherein the attachment structure includes a pair of fitting claws and a pair of fitting grooves corresponding to the fitting claws.

7. The mirror assembly of claim 5, wherein the attachment structure includes a slip-off prevention claw and an insertion hole corresponding to the slip-off prevention claw.

8. The mirror assembly of claim 5, wherein the attachment structure includes a pair of fitting claws, a pair of fitting grooves corresponding to the fitting claws, a slip-off prevention claw, and an insertion hole corresponding to the slip-off prevention claw, and wherein the fitting claws and the slip-off prevention claw are provided at one of the inner peripheral surface of the visor cover annular end portion and the outer peripheral surface of the visor rim annular end portion, while the fitting grooves and the insertion hole are provided at the other of the inner peripheral surface of the visor cover annular end portion and the outer peripheral surface of the visor rim annular end portion.

9. The mirror assembly of claim 8, wherein the slip-off prevention claw is disposed between the fitting claws, and the insertion hole is disposed between the fitting grooves.

10. The mirror assembly of claim 9, wherein the fitting claws and the slip-off prevention claw are provided at the inner peripheral surface of the visor cover annular end portion, while the fitting grooves and the insertion hole are provided at the outer peripheral surface of the visor rim annular end portion.

11. The rearview mirror assembly according to claim 1, wherein said outer edges of said annular end portions of said visor cover and said visor rim forming said loop-shaped opposing portion are substantially straight, and are oriented substantially orthogonally with respect to said surface of said mirror.

12. The rearview mirror assembly according to claim 11, wherein said visor cover and visor end form a connecting portion at one end of said assembly for mounting the assembly to a side of a vehicle.

13. The rearview mirror assembly according to claims 12, wherein said outer edges at said connecting portion are oriented substantially parallel with respect to wind current flowing around said visor cover when said rearview mirror assembly is mounted on a moving vehicle.

* * * * *